United States Patent
Dunn et al.

(10) Patent No.: US 7,239,311 B2
(45) Date of Patent: Jul. 3, 2007

(54) GLOBAL VISUALIZATION PROCESS (GVP) AND SYSTEM FOR IMPLEMENTING A GVP

(75) Inventors: Richard S. Dunn, Hollywood, MD (US); Walter P. Gatewood, Jr., Lexington Park, MD (US); Wayne Erchak, San Mateo, CA (US); Donald Jackson, Lexington Park, MD (US); Christopher S. Allport, Lexington Park, MD (US); Joseph A. Hamilton, Friendswood, TX (US)

(73) Assignee: The United States Government as represented by the Secretary of the Navy, Washington, DC (US)

( * ) Notice: Subject to any disclaimer, the term of this patent is extended or adjusted under 35 U.S.C. 154(b) by 1073 days.

(21) Appl. No.: 10/255,413

(22) Filed: Sep. 26, 2002

(65) Prior Publication Data

US 2004/0061726 A1 Apr. 1, 2004

(51) Int. Cl.
*G06T 15/00* (2006.01)
*G06T 17/00* (2006.01)
(52) U.S. Cl. ..................................... 345/419; 345/428
(58) Field of Classification Search ................ 345/419, 345/420
See application file for complete search history.

(56) References Cited

U.S. PATENT DOCUMENTS 5,495,576 A * 2/1996 Ritchey ...................... 345/420
6,229,546 B1 * 5/2001 Lancaster et al. ........... 345/419
6,256,043 B1 * 7/2001 Aho et al. ................... 345/629
7,010,398 B2 * 3/2006 Wilkins et al. ................ 701/3
7,096,428 B2 * 8/2006 Foote et al. ................. 715/721
2001/0055016 A1 * 12/2001 Krishnan ..................... 345/424

* cited by examiner

*Primary Examiner*—Ryan Yang
(74) *Attorney, Agent, or Firm*—Mark O. Glut

(57) ABSTRACT

A system and process that incorporates hardware and software as elements to be combined with procedures and processes to obtain, format, store, combine, control, display, record, and visualize dynamic scenarios by interacting with accurate, realistic models and actual events within, on, and above a three-dimensional surface to be observed or modeled. One application provides a user-manipulated large-scale dynamic display of systems testing in a real world environment for real time visualization by test personnel. The Global Visualization Process (GVP) system is an integrated software solution for high-performance visualization. GVP software and process is capable of displaying extremely high resolution terrain models and imagery in real time over the entire surface of the planet, as well as a large number of moving entities and their associated graphical models. The system can display imagery at 2 cm/pixel, and infinitely detailed terrain in real time over the whole surface of a planet. All displayed data is referenced to the World Geodetic System 1984 (WGS-84) ellipsoid for true round-earth effects, and can be rendered in correct asymmetric stereo. These features, combined with a network application progamming interface (API), make GVP suitable for flight simulation out-the-window displays, command and control scenarios, and mission review or rehearsal.

9 Claims, 2 Drawing Sheets

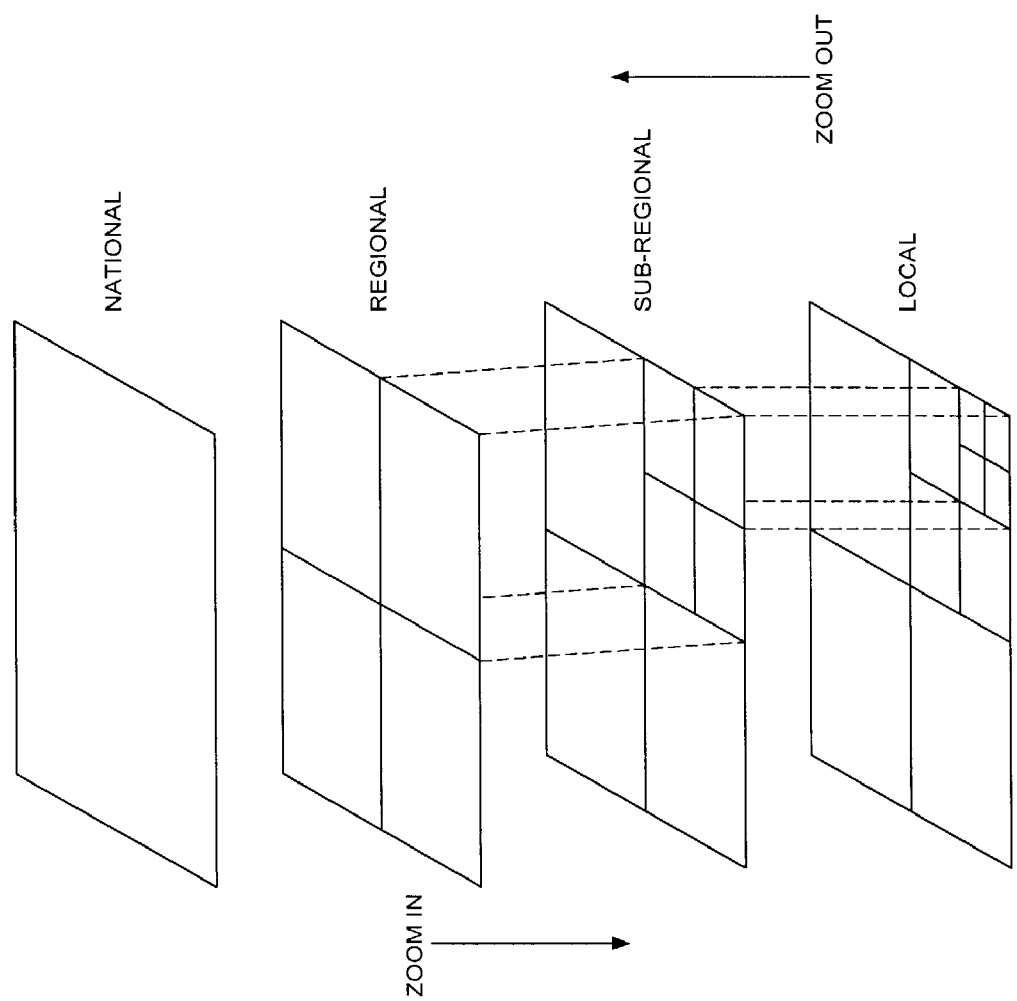

GLOBAL VISUALIZATION PROCESS (GVP) AND SYSTEM FOR IMPLEMENTING A GVP

STATEMENT REGARDING FEDERALLY SPONSORED RESEARCH OR DEVELOPMENT

Figure 1:
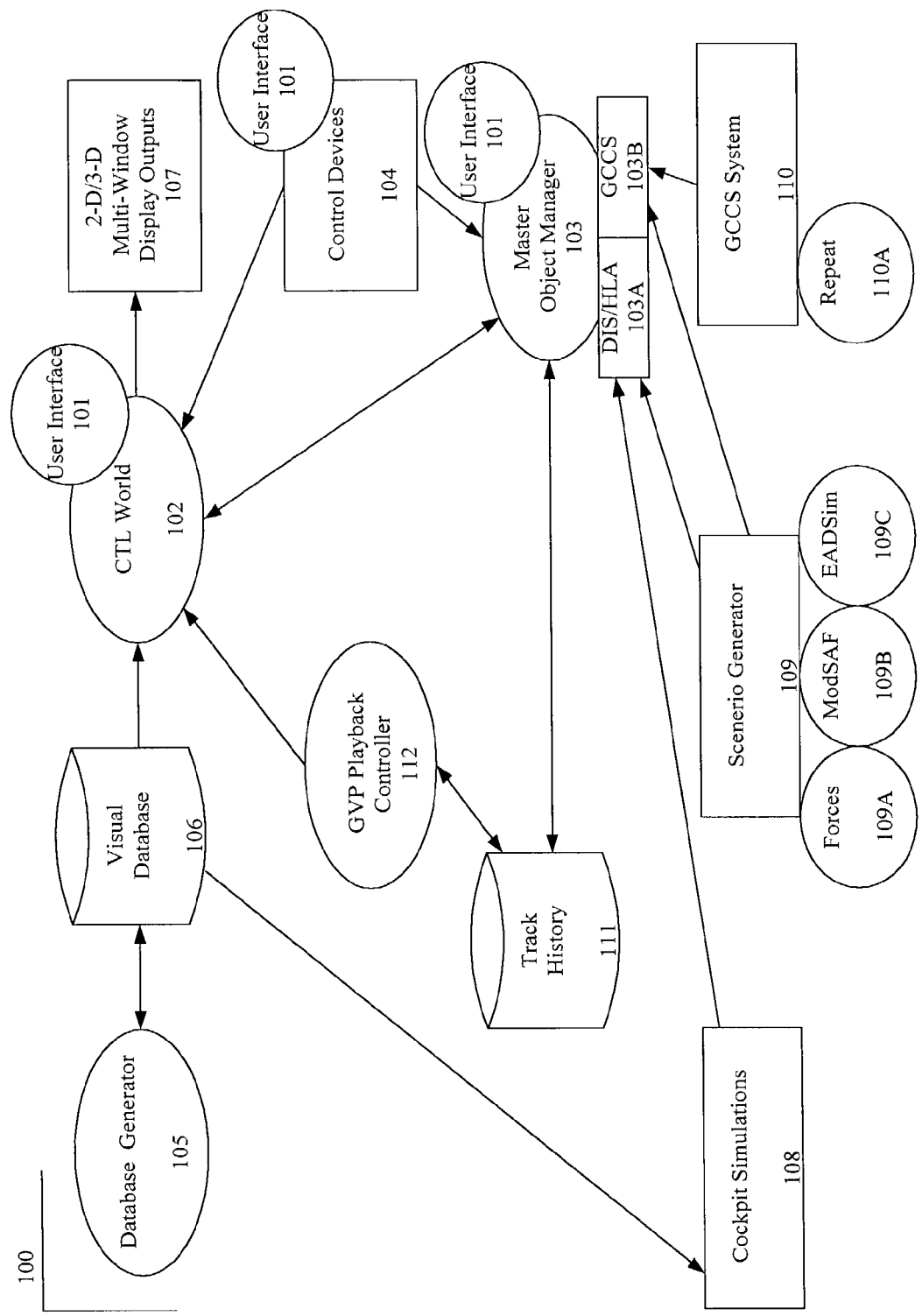

The invention described herein may be manufactured and used by or for the government of the United States of America for governmental purposes without the payment of any royalties thereon or therefor.

BACKGROUND

The present invention relates to optimum visualization of complex scenarios, in particular, a large-scale display, with user-adjustable resolution and viewpoints (these scenarios are displayed as events occur in real time over a wide geographic area). The Global Visualization Process (GVP) system is an integrated software solution for high-performance visualization. GVP software is capable of displaying extremely high resolution terrain models and imagery in real time over the entire surface of the planet, as well as a large number of moving entities and their associated graphical models.

Flight simulation has proved to be an effective method for crew and mission training. An integral component of flight simulation is the out-of-the-window visual scene. The creation of a GVP visualization or visual database for flight simulation (or for mission planning and rehearsal or for other applications such as command and control display systems) typically begins with real-world source data that has been derived from satellite imagery, overhead photography, U.S. Geological Survey information or mapping source materials (which can be typically described as standard sources). The conventional approach until very recently (now still employed in order to comply with limited computer resources) has been to construct a visual environment from representative artificial models and modeled elements to meet specific training objectives.

While a graphics arts constructed visual database system may be very effective for a particular training application, it should also be appreciated that there are many diverse situations where a fully representative visualization system which renders real-world data, unlimited in resolution, scale, and represented area, would be desirable. GVP offers a general-purpose visualization system that does not need to be redesigned for each new project or set of training exercise.

The Global Visualization Process (GVP) of the present invention accomplishes what conventional methods and systems can not. In the context of an integrated system having complementary components for large-scale real time visualization, GVP can display large-scale terrain modeling and simulation depictions, in user selectable resolution, without the numerous drawbacks of conventional systems. Typically conventional systems suffer from some or all of the following limitations: highly specific processes and model data formats limit the range of data inputs to a small subset of available information; video outputs are limited to specific display devices or types; stereoscopic viewing is not supported or is not controllable; overall size of operating terrain models is restricted to small areas and the greater the detail (resolution), the smaller the area displayed; when put in motion, as in flight simulation or when the depiction eyepoint is moved, model depiction has unacceptably low update rates; small numbers of fixed or mobile objects added to the terrain model grossly and unacceptably inhibit the video update rate; model construction and image computation based on fundamental flat-earth geometry introduces gross positional errors with complex variations in magnitude (these errors confound operations when independent systems interact); without major revisions to adapt to multi-processor and multi-pipe computer systems, existing software architecture does not fully exploit state-of-the-art graphics-oriented computers; and conventional systems cannot employ imagery and terrain geometry of mixed resolution, or can do so only with difficulty.

Accordingly, there is a need for a system and process for producing visual databases that preserve the accuracy of the input data by eliminating flat-earth geometry distortions, and with great improvements in speed, area, resolution, and video display output. As GVP was being developed to meet this need, its specialized properties were determined to provide solutions to many more applications.

SUMMARY

The Global Visualization Process (GVP) system is an integrated software solution for high-performance visualization. GVP software is capable of displaying extremely high resolution terrain models and imagery in real time over the entire surface of the planet, as well as a large number of moving entities and their associated graphical models. The system can display imagery at 2 cm/pixel, and infinitely detailed terrain in real time over the whole surface of the planet earth. All displayed data is referenced to the World Geodetic System 1984 (WGS-84) ellipsoid for true round-earth effects, and can be rendered in correct asymmetric stereo. These features, combined with a network application progamming interface (API), make GVP suitable for flight simulation out-the-window displays, command and control scenarios, and mission review or rehearsal. The Global Visualization Process (GVP) enables accurate and rapid visualization of a wide area that may include ongoing complex military maneuvers comprising extensive spatial and temporal gradients. GVP combines actual imagery, geometric relationships and stored map data, with location and activity information for both mobile and fixed objects to generate and control display of large-scale visual depictions (visualizations). GVP integrates data using full external network connectivity for both simulations and actual operations.

Applications include human visualization for command and control of military operations, tests, training, reconnaissance and surveillance, simulations, mission rehearsal, war games and synthetic vision systems. GVP produces high quality displays having dynamic and perceptual properties matched to user needs while providing 3 immediate use of acquired data. GVP can be adapted for use by a single person, such as a virtual image display, or large group displays, such as theaters. GVP may provide standard two-dimensional outputs or stereoscopic depictions thus matching a user's perceptual requirements for complex events and spatial interactions, such as may occur in war games.

A preferred embodiment of the present invention provides a system and process that incorporates hardware and software as elements to be combined with procedures and processes to obtain, format, store, combine, control, display, record, visualize and interact with accurate, realistic models and events within, on, above and below a three-dimensional surface to be observed or modeled.

A preferred embodiment of the present invention discloses a process for dynamic human visualization of events occurring within a volume having varying spatial and temporal gradients, which provides readily adjustable scale and resolution, and initiating activities internal thereto. A preferred embodiment of the process comprises: acquiring data that represents imagery, geometric and time relationships to be used for generating motion paths, stored maps, location, and activity, and the data is acquired from standard sources; integrating the data using full external network connectivity, the data is acquired from simulations, actual events or standard sources and the data includes multi-source satellite and aerial imagery available in various wavelengths and formats; developing at least one database, having a software architecture from which at least one model is generated; generating at least one display containing at least one depiction from said at least one model and said data, wherein said depiction may be displayed in real time; controlling said at least one display.

A preferred embodiment of the present invention discloses a system, having inputs, and outputs, that enables a process for dynamic human visualization of a volume, including events having varying spatial and temporal gradients that are occurring within the volume. The system provides readily adjustable scale and resolution and initiating activities internal thereto. The system comprises: at least one data generator as at least one source of data (the data represents imagery, geometric and time relationships to be used for generating motion paths, stored maps, location, and activity and the data is acquired from standard sources); memory for storing and accessing at least a portion of the data; at least one interface for communication between the system and external devices; at least one visualization device, having inputs and outputs, for displaying at least one depiction (the depiction may be derived at least in part from a model, having at least one input and at least one output, and is displayed in real time); at least one record and playback device for provision of at least some inputs to the visualization device; software for manipulating the process (the software is used to generate at least one database and the software is used at least in part to create at least one model from the database and, the software is used to control the inputs to and the outputs from at least one model for inputs to at least one display and the software is used to control the outputs from the record and playback device and the interface), and at least one controller for controlling said inputs and outputs to the system. In a more preferred embodiment, the data generator comprises at least one device such as a real time data collection system, a GCCS system, a scenario generator, a device simulator or a cockpit simulator.

A preferred embodiment of the system and process includes using quad tree architecture for terrain geometry files and clip texture imagery, a Master Object Manager to separate objects, and a geographical coordinate system, such as WGS-84, to convert the imagery into one global model.

Using the quad tree architecture allows management of both position and resolution variations within the clip texture files and the terrain geometry files and facilitates the population of at least one worldwide database. The resolution of the display can be adjusted for varying eyepoints with a first adjustment possibly defining a first level of a plurality of levels within the quad tree architecture. Each succeeding level of the plurality of levels consists of four sub-sectors each depicting a quarter of the area of the depiction of an immediately preceding level but containing the same amount of image data as the depiction of the immediately preceding level, thus providing higher resolution than any of the preceding levels. Further, moving through the plurality of levels, in either direction, provides a resolution required by a user.

The Master Object Manager module having software architecture, interfaces to outside events and collects communication and control processes. The Master Object Manager can interact with standards-based processes such as distributed interactive simulation (DIS), Department of Defense (DoD) systems under High Level Architecture (HLA), Defense Information Infrastructure Common Operating Environment (DII-COE) formats for the Global Command and Control System (GCCS), and commercial computer network communications protocols. The software architecture of GVP with the Master Object Manager achieves update rates facilitating real time viewing on the display and permits a user's areas of interest to be embedded at a pre-selected resolution. The system accepts data in formats such as DII-COE messages in GCCS-M, Combat Command and Control System, HLA, DIS, military LINK, and air traffic control radar or any combination thereof.

Accurate and rapid visualization of an area via orienting position is based on the WGS-84 geophysical standard for world shape to at least one eyepoint. The WGS-84 geophysical standard is fully compatible with standard navigation systems and included within the desired area are events having a range of spatial and temporal gradients. Also, systems operating to the WGS-84 permit navigation systems to connect, register, and synchronize within the process. As a result, the accuracy of the data received by the system is preserved.

Initially GVP addressed the need to depict complex military flight test operations. For planning, controlling, and assessment, the need for rapid clear communication between all concerned could be met only by some method of advanced visualization.

It is a feature of the present invention to provide a GVP that accepts data inputs or source material from a large variety of available information for terrain model construction. This includes map data, image data and terrain shape data.

It is another feature of the invention to provide a GVP that provides a range of data inputs suitable for a large variety of available information and provides for video outputs to a variety of display devices. Additionally, the invention provides for stereoscopic viewing, provides for operating terrain models of large areas at suitable resolution for human interpretation, provides for ready updating of dynamic model depiction (which is particularly useful in flight simulations or when the eyepoint is changed), and provides a usable video update rate even when large numbers of objects are added.

It is also feature of the present invention to provide a GVP that utilizes calculations and model construction that are based on round-earth geometry (thus eliminating positional errors), and utilizes software architecture that fully exploits state-of-the-art graphics-oriented computers and readily employs imagery and terrain geometry of mixed resolution.

Advantages of preferred embodiments of the present invention, as compared to conventional systems, include, but not limited to, permitting: accurate and rapid visualization of a wide area; visual capture of activity involving extensive spatial and temporal gradients; merging of actual imagery, geometric relationships and stored map data, with location and activity information; generation and control of the display of large-scale visualizations; integration of data using full external network connectivity; production of displays meeting a user's dynamic and perceptual requirements; immediate use of acquired data; adaptation for use by a single person or a large group; standard two-dimensional outputs or fully stereoscopic depictions; support for both simulations and actual operations in real time; simplified design of alternate configurations; improved robustness; increased flexibility; and ready upgradability.

Embodiments of the present invention can be applied to depict any activity requiring a decision maker to undertake one or more of the following actions: plan, coordinate, control, communicate, command, assess, reconnoiter, negotiate, direct, collate, organize, or terminate activities, or any action related to any of the above, either before or after in time. Sample activities include, but without limitation, military flight test operations, training, simulations, tests, computer modeling, war games, maneuvers, combat operations, flight guidance or vehicle guidance and domestic disturbances. The realistic training available with the system saves capital equipment, as well as training and maintenance costs, while providing a better-trained individual. GVP may also provide top-level decision makers with very realistic "hands-on" experience without the expense of participating in an event that could cost lives and material.

Preferred embodiments are fully disclosed below, albeit without placing limitations thereon.

DRAWINGS

These and other features, aspects and advantages of the present invention will become better understood with reference to the following description and appended claims, and accompanying drawings wherein:

FIG. 1 is an overall flow chart depicting functions performed in a preferred embodiment of the present invention; and FIG. 2 is a diagrammatic perspective view showing a "tree" data structure relationship between grid quadrangles at different grid levels for shifting or scrolling between grid quadrangles at the same grid level and "zoom in" and "zoom out" between grid quadrangles at different levels.

DESCRIPTION

A preferred embodiment of the present invention, the system 100 of FIG. 1, incorporates hardware and software as elements to be combined with procedures and processes to obtain, format, store, combine, control, display, record, visualize and interact with accurate, realistic terrain models and events or activities in, on, above and below the terrain. Elements of the developmental system include several commercial computer and display products of advanced but conventional design. The GVP software runs on standard computers, including both graphics processing computers and personal computers. Some of the software employs commercially available programs and interfaces with commercially available programs.

Again referring to FIG. 1, User Interfaces 101 permit software manipulation of databases, storage, interface to internal sources and an external interface module (Master Object Manager 103), replay, and a display through CTL World software 102, interface 25 to sources external to the process and internal functions via a software module, Master Object Manager 103, and user input and control through a variety of electro-mechanical control devices 104, such as a keyboard, mouse, or joystick.

A database generation process 105 functions (off-line) to make visual database file structures which populate a visual database 106. The database generation process 105 may be manipulated by CTL World software 102 to provide displays 107 in multiple windows in either two or three dimensions and which may also be input directly to displays in cockpit simulations 108. The Master Object Manager 103 provides interface to external sources. This may be done, but without limitation, either by simulations using DIS or a HLA or actual scenarios using GCCS 103B. Simulation scenarios may be provided by a scenario generator 109, that may include inputs from conventional modeling and simulation programs such as FORCES 109A (Force Operational Readiness Combat Effectiveness Simulation), ModSaF 109B (Modern Semi-automated Forces), EADSIM 109C (Extended Air Defense Simulation), or actual or simulated events using a GCCS system 110, including its Repeat (data record and replay) mode 110A. A history of object positioning, eyepoint and events is maintained as a Track History 111, in turn provided to a replay system, GVP Playback Controller 112, for manipulation by CTL World software 102 in developing depictions for display on a multi-window display 107 or for use by the Master Object Manager 103 including for use as input to cockpit simulations 108.

GVP incorporates specialized processes to develop terrain models, termed database generation 105. Standard commercial database generation support software including TERREX™, ERDAS IMAGINE®, MULTIGEN®, and SGI® elements are employed in specialized or customized ways along with customized or original CTL software and procedures to turn terrain imagery and elevation data files into GVP terrain model database products, i.e., a visual database 106. The specialized file and world geometry of GVP requires specific and unconventional operations to organize standard source data 113 in terrain imagery and elevation data to create terrain databases 106. Major parts of the database development processes run on small single processor or multiprocessor PCs, and can apply to data from all conventional sources, including multilayer map material. For example, satellite and aerial imagery from numerous sources, in different wavebands and formats, have been processed successfully. Visual databases 106 for GVP are populated by generating imagery files, called clip texture files and storing these separately from terrain geometry files. Terrain geometry, as processed for database use, generates triangulated irregular network (TIN) files. These are polygons assembled to approximate the surface shape of the terrain. Coordinating the image files, the geometry files, relative information content and sequencing for precision and speed in both the file generation processes and in the image generation process is a key strong point of the GVP invention. Both types of files have an associated resolution (provided as data density) indicating the degree of precision in representing the actual source terrain. An advantage of GVP is that clip texture files and terrain geometry files are retained and processed separately, not being combined until late in the "display generation" process, thus saving interim computation steps.

As illustrated in FIG. 2, GVP applies dual "quad tree" architecture for the clip texture and terrain geometry files. In actuality, the terrain imagery files comply with the SGI® display software, PERFORMER™, which employs clip textures in a hierarchical format of SGI® design. However, other display control programs capable of generating video views of 3-D modeled objects could be incorporated. For the purposes of this application, it is a quad tree, forming one half of the dual quad tree architecture. In a preferred embodiment of the present invention, a base terrain skin is generated according to an approach referred to as the "quad tree" approach. Under the quad-tree approach, a region of terrain represented by a tile at a coarser level of detail may be represented at the finer and next level of detail by four tiles. Furthermore, the scene graph is generated such that when the terrain skin is played back, a tile is never displayed at a level of detail that is more than one level different from the level of detail of any adjacent tile. Finally, the polygons in each tile are generated so that the shared edges between the tiles appear well matched. Techniques for generating a terrain grid according to the quad-tree approach and for generating grids formed of matched shared edges are well known to those skilled in the art. Using a dual quad tree approach, that is one for terrain shape and one for imagery, enables management of both position and resolution variations for development of "world-wide databases". GVP achieves its high performance in area, resolution, precision and speed by effective innovations, architecture, and balanced design in the dual quad tree approach. At the lowest resolution (data density) and detail, an entire hemisphere can be depicted in one working file level. The resolution of the display 107 can be matched or exceeded for distant eyepoints (not separately shown), e.g., a view that includes an entire hemisphere, by a visualization database 106 with relatively low resolution, i.e., on the order of 1 or 2 kilometers smallest detail element. This "zoom out" version comprises the first quad tree level for the GVP architecture for both clip texture and TIN files. Each level is further divided into four sub-sectors depicting one-quarter of the area, but with similar file size and amount of detail data or polygons thus making much higher resolution as first "zoom in" version. This structure is repeated as necessary to provide the resolution required by a user, i.e., additional "zoom in" and "zoom out" versions, as illustrated in FIG. 2. Imagery is also processed in stages with increasing resolution and conforming to the TIN Quad Tree file structure. This forms the basic information storage and data manipulation architecture of the GVP system.

A preferred embodiment of the present invention incorporates an architecture with 32 levels that can hold and operate anywhere on the earth's surface with a maximum resolution of about two centimeters. Further, the architecture is expandable, as necessary for higher resolutions or other purposes, such as celestial bodies, operations in space, or even for mapping manmade objects.

Advantages of GVP include: the processes of database implementation tailor multi-source data and generate-quad tree structured terrain models with corresponding image data files; storage is implemented in a conventional computer hard disk array; display software, termed "CTL World," accesses the quad tree files to page in data at the resolution required to match eyepoint and display considerations, to order the computation of video display images and to do everything required to generate completed viewable models; and the GVP also includes stereoscopic display considerations.

The CTL World display generation process uniquely combines several advances in visualization software. One advance includes, but without limitation, model and computational architecture which retains separation of the texture (or imagery) and geometry files until late in the display run time, thus truncating much of the preliminary computation prior to window content selection. This, in turn, permits current computers to produce fast update rates, above 30 frames per second, suitable for demanding flight simulation and other applications. Another advance utilized is improved world reference geometry which bases the position orienting processes on the WGS-84 Geophysical Standard for world shape, in turn being fully compatible with modern navigation systems. Also utilized are models built using GVP retain positional accuracy in the original data, which in turn, enable accurate depiction of platform locations and reported events. Models built using GVP retain positional accuracy in the original data, in turn, permitting effective verification and validation operations. Another advance utilized is terrain and imagery file structure which permits multiple resolutions or detail levels so that areas of interest can have highly detailed coverage while other areas do not. Selected areas can be revised or updated independently. Coverage areas and detail levels can be populated to fit the available storage facilities (disk array resource allocation), and not be constrained by other computer system limitations. CTL World software can also be used. CTL World software incorporates flexible user interface provisions, various input device drivers for position and motion control, and broadly functional application programmer interface (API) features enabling quick tailoring to new uses.

Input devices 104 include, but without limitation, multiple controls for video signal outputs for display device type and location matching adjustments, control over the stereoscopic rendering parameters, and input selection options for motion-position control devices such as two-axis joystick controls and three-axis (six degree of freedom) helmet motion trackers.

Completing the basic GVP architecture is a separate software module termed the Master Object Manager 103. Master Object Manager 103 interfaces the system to outside events of all types and determines the objects and activities displayed with the terrain model. It permits two way communication with simulation 108, modeling 109 and operational events 110 external to GW. Network operations currently implemented via Master Object Manager 103 interact with standards-based processes for distributed interactive simulation (DIS), and with the DoD systems operating with High Level Architecture (HLA) 103A. For interaction with operational forces 110 the interface employs Defense Information Infrastructure Common Operating Environment (DII-COE) formats (not separately shown) for the Global Command and Control System (GCCS) 103B. In these formats, and generally compatible with computer network communication protocols, Master Object Manager 103 assembles and tracks locations, orientation, types, activities, and depiction-relevant factors for fixed and mobile objects of all types. Within the Master Object Manager 103, various sorting, filtering and aggregation algorithms refine an "object list" (not separately shown) for the display system 107. Some aspects of selection for visibility and display level of detail (LOD) required are conducted inside Master Object Manager 103 to reduce computational demands in the CTL World display generator 102. This reserves computer resources for the graphics processes CTL World display generator 102 and orders the data traffic between the CTL World display generator 102 and processes or systems outside GVP including simulations 108, scenario generators 109, and operational events 110. In addition, Master Object Manager 103 can command or "feed" multiple copies of CTL World 102 to match a variety of extended visualization generation demands and to synchronize multiple remote or nearby visualization processes to a common consolidated data set.

Finally, the GVP architecture is completed by two supplementary elements, a track file recorder 111 to store motion paths as track history of various events for data purposes, and an all purpose event replay control utility, shown as GVP Playback Controller 112. Processes external to GVP, but to which it is designed to be connected, e.g., simulators 108, models 109, and operational data or operational data recorders 110, normally have their own data recording and replay capability. These two elements of GVP function to replace those separate operations, combining sources for the display 107 and for activities initiated internal to GVP. For example, the local computer interface to GCCS 110 inputs is itself a computer and has record-playback capability (i.e., "Repeat" 110A). The Repeat capability might suffice, to reconstitute and replay or manipulate visualizations accomplished with the GVP system alone, but if the visualization involves other data sources as well as GCCS 110 events, this would not be practical. Thus, GVP uses its track history 111 and GVP Replay Controller 112 to reconstruct and manipulate visualizations.

In sum, in an embodiment for use by government users, GVP incorporates a suite of government owned products and software processes that are suitable for use in a variety of applications, e.g., military scenario depiction and visualization. The specialized architecture of GVP allows creation of operating models that are geo-specific, geo-referenced and universally scalable. The results are accurate depictions of a round world. The GVP products support immediate direct application in a variety of possible roles, all emphasizing enhanced situational awareness, precision, and accuracy in the use of positional information, as well as support for a higher tempo of operations with increased confidence and reduced risk. Further, imagery-based terrain models, with terrain elevation data, can be generated from all data sources 108, 109, and 10 in selectable degrees of resolution. Combined for display, products can include terrain models, fixed and mobile object models, weather or visibility effects, and map materials with multiple "layers" of information.

GVP operating models are geo-specific, geo-referenced and universally scalable. In a preferred embodiment of the present invention, a geographical coordinate system enables accurate and rapid visualization of an area via orienting position based on a geographical coordinate system to at least one eyepoint. The geographical coordinate system is fully compatible with standard navigation systems and permits navigation systems to connect, register, and synchronize with the system. In a more preferred embodiment of the present invention, an internationally valid coordinate system is incorporated as the geographical coordinate system. An applicable geographical coordinate system is the round-world WGS-84 standard that permits inputs from all modern navigation systems to connect, register, and synchronize correctly. The WGS-84 is an approximation of the earth's surface defining a coordinate system, which provides a reference surface for GVP, and the geoid is the difference between the WGS-84 model and the true surface of the earth. Terrain model resolution is dependent primarily on source imagery characteristics, but there are important considerations with respect to demands for memory, i.e., dynamic computer texture memory, dynamic graphics memory, and application-specific demands for display update rate. GVP software architecture has been optimized to achieve very high update rates. The GVP software can achieve update rate of between 50 and 60 frames per second including in stereoscopic mode. Additionally, specific "high interest" areas, as identified by a user, may be embedded in GVP models at a required high resolution.

The GVP software handles large complex models while maintaining a high update speed, i.e. above 50 frames per second. A typical set of cultural features, such as buildings, can be added to GVP terrain models without adverse impact on frame rate. Large numbers and many types of mobile objects can be added with appearance, location, and dynamics established by external sources 108, 109 and 110. The GVP architecture and model-handling processes enable relatively large numbers of such scenarios to be modeled or displayed while maintaining high update rates.

Terrain and any depicted features or modeled objects display at appropriate and controllable resolution levels or level of detail based on primary object resolution, eyepoint distance and display 107 surface capability. The eyepoint(s) for viewing are entirely controllable along with all other relevant display 107 parameters.

Communication to the system is established and functional in several modes. Military elements and operational entities can be connected via DII-COE messages in GCCS-M or other variants of the Combat Command and Control System standards. All types of simulation can be connected via HLA standards-compliant means and by DIS-formatted data 103A. Other standard means such as the military LINK and air traffic control radar data (not separately shown) are also accommodated.

By using a separate but integrated Master Object Manager module 103 for collecting communication and control processes, the architecture streamlines CPU (not separately shown) resource allocation, manages communication bandwidth, structures upgrade efforts in the sense of tailoring the system for selected uses, employs consistent application programmer interface (API) elements (not separately shown), and assures reusability and scalability in GVP application task software 102.

The GVP CTL World display software 102 architecture is written for, and adapts itself to, multi-processor CPUs, multi-channel video outputs (not separately shown), and multi-pipe computer systems (not separately shown), using all system resources.

The GVP CTL World software 102 that controls video output and creates the visualization is government owned software and includes interfaces to all software drivers (not separately shown) for input and output devices. Complete process and programming control affords freedom to optimize the system for specific applications and to capitalize on any available innovations. Interactive devices such as, but without limitation, mouse controls, joysticks, helmet-mounted head and eye trackers, voice control, gesture recognition, etc. can be used without limitations imposed by inaccessible software source code.

All depictions in the basic GVP displays can be formatted as video products to be operated and displayed as perspective 2-D views of 3-D models 107, scalable to various ranges and viewpoints. The GVP CTL World software 102 also supports binocular stereopsis for true 3-D displays in several modes. CTL World 102 outputs active stereo, viewable with shutter glasses for left and right eye view control. Dual optics virtual displays without shutters, i.e. virtual display devices, are directly supported including those for head directed, helmet mounted or head mounted displays. CTL World software 102 also supports custom 3-D visualization products such as FAKESPACE VERSABENCH™ and other passive stereo displays which are generally viewed with polarized lenses for left and right view control.

For all viewing modes and devices, CTL World software 102 has the necessary control over video output to provide corrections and adjustments to match or trim for display device and viewing geometry requirements. Explicit control of all stereo viewing parameters is incorporated in CTL World software 102 for full control of the stereoscopic viewing experience. Dynamic response to scaling changes in eyepoint is provided to maintain the intended stereoscopic effects.

In one embodiment, GVP supports investigation of human engineering issues in advanced technology displays and information visualization. It provides effective and efficient software having an architecture tailored to interactive military systems. In another role, GVP can help speed development, while reducing costs of new systems, by covering in simulation and testing various aspects of DoD missions.

Additionally, GVP may be implemented to reduce required memory to hold large area database files by incorporating fast file compression and decompression. Further, GVP may be implemented to accept "streaming" information, i.e., "continuous" real time imagery or other data from sensors, to update or replace database material, thus, providing timely updates for "real time" visualization.

EXAMPLES

Models suitable for flight simulator operation as out-the-window displays. Because GVP is fully compliant with "round-world" geometry standards, interfaces are facilitated in interactions between simulation models such as DIS that incorporate operational position data in the simulation. The GVP model type and construction and the GVP CTL World display software comprise a standard or uniform product type suitable for "high end" military flight training simulators.

Unmanned Airborne Vehicle (UAV) and UCAV systems. GVP is suitable for training, multi-platform command and control, reconnaissance and surveillance processes, planning and rehearsal, and rapid prototyping applications.

Interactive visualization during tactical flight operations. Applications range from mission rehearsal including while deployed or airborne to operational exploitation of near real time tactical intelligence. GVP-based displays, by providing a full visualization context for mission depiction, may also provide a natural means for ground and aircrew to interact with and control advanced interactive aircraft design features for pilot aiding devices and system automation features.

The above descriptions should not be construed as limiting the scope of the invention but as mere illustrations of preferred embodiments. For example, although examples discussed at length military applications, the method and apparatus is applicable to any that a user may need to visualize in real time "relatively wide" areas within which dynamic "relatively large" scale events occur. The scope shall be determined by appended claims as interpreted in light of the above specification.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to a certain preferred embodiments thereof, other embodiments are possible. Therefore, the spirit and scope of the appended claims should not be limited to the description of the preferred embodiment(s) contained herein.

What is claimed is:

1. A process for dynamic human visualization of events occurring within a volume having varying spatial and temporal gradients, said process providing readily adjustable scale and resolution, and initiating activities internal thereto, the process comprising:

acquiring data, wherein said data represents imagery, geometric and time relationships to be used for generating motion paths, stored maps, location, and activity; integrating said data, wherein said integrating said data uses full external network connectivity, wherein said data is acquired from simulations, actual events or other sources, and wherein said data includes multi-source satellite and aerial imagery available in various wavelengths and formats;

developing at least one database, having a software architecture from which at least one model is generated; generating at least one display containing at least one depiction from said at least one model and said data, wherein said depiction is displayed in real time;

controlling said at least one display;

enabling accurate and rapid visualization of an area via orienting position based on a geographical coordinate system to at least one eyepoint, wherein, said geographical coordinate system is fully compatible with navigation systems, wherein included within said area are events having a range of spatial and temporal gradients, and wherein systems operating to said geographical coordinate system permit navigation systems to connect, register, and synchronize within said process, at least one model is a terrain model, wherein said terrain model contains terrain imagery and geometry data, wherein said at least one model retains the positional accuracy inherent in said data as originally acquired, wherein retention of the positional accuracy enables an accurate depiction of an object's location and dynamic replay of events occurring within said volume, wherein said at least one model is geo-specific, geo-referenced, and universally scalable and provides an accurate depiction representative of a round world, wherein, cultural features are added to said software architecture with negligible impact on response time of said process, wherein, types and instances of mobile objects are added having appearance, location, and dynamics established by external sources, and wherein, said software architecture and said process enable multiple scenarios to be modeled or displayed while maintaining fast update rates; and, employing database software to convert data files from said at least one model into database products, wherein, said data files consist of a portion of said terrain imagery and a portion of said geometry data contained in said terrain model, wherein, said terrain imagery combined with said geometry data incorporating terrain elevation is generated from more than one source in at least one pre-selected degree of resolution, wherein, said database products are terrain models, fixed and mobile object models, weather or visibility effects, or map materials with multiple layers of information, wherein, cultural features are added to said software architecture with negligible impact on response time of said process, wherein, many types and instances of mobile objects are added, said instances having appearance, location, and dynamics established by external sources, and wherein, said software architecture and said process enables multiple scenarios to be modeled or displayed while maintaining update rates that facilitate real time display.

2. The process of claim 1 further comprising:
interfacing to outside events;
defining objects and events to be displayed using said model; and
providing two-way communications with external events; wherein said interfacing is accomplished via a Master Object Manager module having software architecture, wherein said Master Object Manager collects communication and control processes, wherein said Master Object Manager can interact with standards-based processes selected from the group consisting of: distributed interactive simulation (DIS), DoD systems under High Level Architecture (HLA), Defense Information Infrastructure Common Operating Environment (DII-COE) formats for the Global Command and Control System (GCCS), and commercial computer network communications protocols, wherein, said software architecture of said Master Object Manager achieves update rates facilitating real time viewing on said display and permitting a user's areas of interest to the embedded at a pre-selected resolution, and wherein, said data is in a format selected from the group consisting of: DII-COE messages in GCCS-M, Combat Command and Control System, IILA, DIS, military LINK, and air traffic control radar or any combination thereof.

3. The process of claim 2 employing at least one specialized file structure in CTL World software architecture, world geometry, and at least one specialized operation to organize said data, wherein said world geometry is provided by CTL World software's display generation process, wherein, said CTL World software incorporates flexible user interface provisions, various input device drivers for position and motion control, and broadly functional application programmer interface (API) features, and wherein, said CTL World display software is written for, and adapts itself to, multi-processor CPUs, multi-channel video outputs, and multi-pipe computer systems.

4. The process of claim 1 wherein said at least one database is populated with clip texture files, said clip texture files stored separately from said geometry files, wherein said separate storing until run lime of said clip texture files and said geometry files eliminates at least some computation prior to window content selection for said at least one display.

5. The process of claim 4 wherein said geometry files are used to generate triangulated irregular network (TIN) files, wherein said TEN files are polygons assembled to approximate the surface shape of terrain.

6. The process of claim 5 wherein said clip texture files and said TIN files have an associated data density that indicates the degree of precision in representing actual terrain, wherein said clip texture files and said geometry files are retained and processed separately until combined immediately prior to said generating said at least one display.

7. The process of claim 4 further comprising applying dual quad tree architecture to said clip texture files and said terrain geometry files,
wherein management of both position and resolution variations within said clip texture files and said terrain geometry files facilitates the population of at least one worldwide database,
wherein resolution of said display can be adjusted for varying eyepoints, a first adjustment possibly defining a first level of a plurality of levels within said quad tree architecture,
wherein each succeeding level of said plurality of levels may consist of four sub-sectors each depicting a quarter of the area of said depiction of an immediately preceding level but containing the same amount of image data as said depiction of the immediately preceding level, thus providing higher resolution than any of said preceding levels, and
wherein moving through said plurality of levels, in either direction, provides a resolution required by a user.

8. The process of claim 7 in which said dual quad architecture is expandable, wherein said dual quad architecture consists of 32 levels that can hold and operate anywhere on the earth's surface with a resolution of two centimeters.

9. The process of claim 3 wherein said Master Object Manager assembles and tracks locations, orientation, types, activities and depiction-relevant factors for objects, wherein said Master Object Manager refines an object list for said display by incorporating various sorting, filtering mid aggregation algorithms, wherein some aspects of selection for visibility and said display's level of detail required are conducted within said Master Object Manager to reduce computational demands in said CTL World display generator, thereby conserving memory resources for graphics processes while ordering data traffic between graphics processing and external systems, and wherein said Master Object Manager may feed multiple copies of said CTL World to match various extended visualization generation demands.

* * * * *